March 6, 1962 R. D. BLUM 3,024,008
THREE-PIPE AIR CONDITIONING SYSTEMS
Filed Jan. 23, 1958
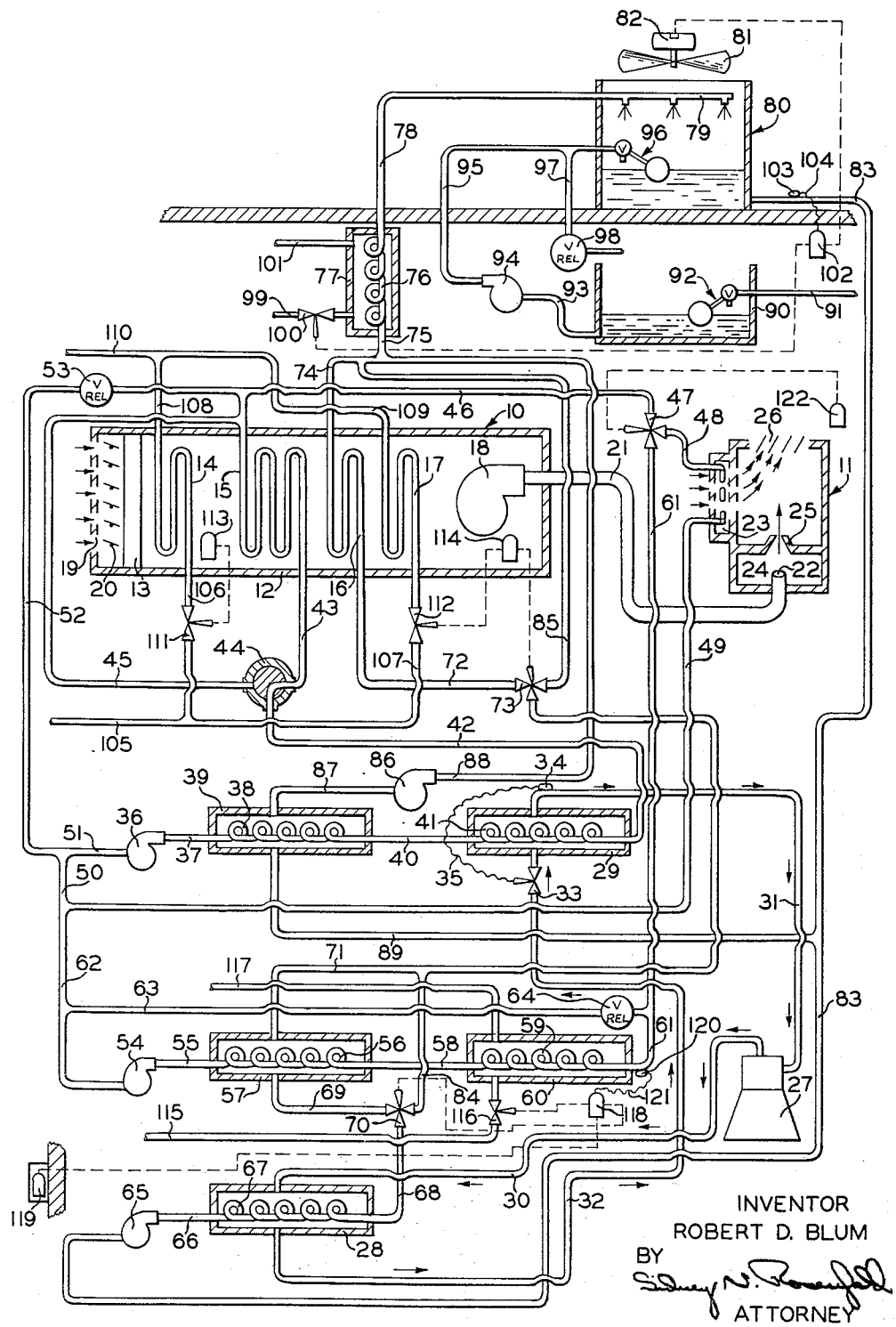
INVENTOR
ROBERT D. BLUM
BY
Sidney N. Rosenfeld
ATTORNEY

United States Patent Office 3,024,008
Patented Mar. 6, 1962

3,024,008
THREE-PIPE AIR CONDITIONING SYSTEMS
Robert D. Blum, York, Pa., assignor to Borg-Warner, Corporation, Chicago, Ill., a corporation of Illinois
Filed Jan. 23, 1958, Ser. No. 710,751
15 Claims. (Cl. 257—283)

This invention relates to air conditioning systems for year-round conditioning of multi-room buildings.

In a typical air conditioning system and specifically a conventional induction system, induction units are provided in or near the various rooms to be air conditioned. Each unit comprises primarily a heat-exchange coil and a nozzle means. Outside or primary air is treated in a central conditioner and is led to a plenum chamber in the unit. The primary air discharges through the nozzle means at a velocity sufficiently high to induce a flow of room air through the unit. The heat-exchange coil is placed in the path of flow of the room air and thereby effects local conditioning of the room air. The two air streams (primary and room) then merge and discharge into the room. A heated or chilled heat-exchange fluid, such as water, is circulated through the heat-exchange coil dependent on whether it is desired to add heat to or remove heat from the room air.

The system as set out above has a great degree of flexibility because of the fact that when the outside temperature is below the temperature it is normally desired to maintain within the rooms, known as the design temperature and generally on the order of 75° F., chilled water is available at the room coil and dehumidified and heated primary air is supplied to the unit. This allows the system to either heat (no chilled water flow through coil) or cool (flow of chilled water through coil). During those times of the year that the outside temperature of the air is sufficiently low to provide for the necessary cooling within the building to be conditioned, then the system goes on the so-called winter cycle. During the winter cycle, heated water is available at the room coil and cold air is supplied to the unit. This allows the system to cool (no heated water flow through coil) or heat (heated water allowed to flow through the coil).

The disadvantages of the system lie in the fact that either chilled or heated water is supplied to the coil and, where automatic controls are used, these become very complex. When, therefore, chilled water is supplied to the coil, opening the valve which controls the flow of water would provide cooling while opening these valves when heated water is supplied to the coils would provide heating. Therefore, some means must be provided for reversing the controls to provide for the above. Even when hand-operated valves are used some means must be provided for indicating whether heated or chilled water is available. One cannot rely on sensory perception to indicate this, since even heated air at a relatively low humidity and high velocity could give a sensation of cooling.

A further disadvantage occurs during those times of the year when the outside temperature is below the design temperature but higher than the temperature at which the system goes on the winter cycle, which shall be called hereinafter the intermediate cycle of operation. This is due to the fact that the primary air supplied to the units is heated to a temperature sufficiently high to take care of the wall and glass transmission losses of the rooms to be conditioned. As a practical matter, however, in most rooms this transmission loss may be almost balanced or completely balanced by the heat gains within the room due to people, lights, solar effect, etc. We have then the situation of a room having no net gain or loss and yet being simultaneously supplied with heated air and chilled water. It can be readily seen that this constitutes an operating loss of considerable magnitude.

In an effort to obviate the primary disadvantages of the conventional induction system (the complex and expensive winter-summer controls) I proposed a system as set out in my applications Nos. 638,962 (now Patent No. 2,928,260) and 670,202 (now Patent No. 2,930,593), wherein chilled water would be available at the unit coil the year-round and primary air would always be supplied at a temperature to take care of the wall and glass transmission. Heat picked up by the chilled water is then dissipated into the incoming primary air when there are transmission losses from the building or the air otherwise needs heating. While obviating the major difficulties of the prior, conventional induction system, it will be apparent that in my prior proposed system the operating losses, as outlined above, will not be confined to the intermediate cycle of operation but will extend also through winter operation, since, in this respect, there is no change between the two cycles of operation. I now propose a new system that does away with the complex winter-summer controls of the conventional system and does not suffer the operational losses of my former proposed system.

This is accomplished by providing an induction system of the aforementioned type wherein primary air is first treated and dehumidified in a central conditioner and then led to the induction unit at a temperature which I shall refer to as "neutral." By "neutral" I mean that temperature to which the air must be chilled in order to properly dehumidify it when dehumidification is necessary. During those times of the year when no dehumidification is necessary, for instance when the outside air temperature is below approximately 48° F., then it will be the temperature at which the air is permitted to pass through the primary conditioner—this would be generally a temperature now lower than 40° F., which is necessary to prevent freeze ups within the primary conditioner.

A separate supply of chilled water and heated water is available for flow through the unit coil depending on whether there is a net heat loss or heat gain from the room to be conditioned. The entire heating or cooling load will then be done within the space to be conditioned. It can be seen that there will be no operational losses. During those times of the year, for example, that there is a transmission loss which is exactly balanced by internal heat gains, then neither chilled water nor heated water will flow through the unit coil, or only so much heated water as may be necessary to bring up the temperature of the primary air to the desired room temperature.

This system shows one further advantage over either the conventional system or my former proposed system. In both of these two systems, during certain times of the year, the primary air supply is heated to take care of the wall and glass transmission losses. It will be apparent that, in order to maintain a common re-heat temperature for all the rooms, those rooms which, perhaps, have a double exposure (such as a corner room or the rooms on the top floor of a building which have greater transmission losses) must be supplied with a proportionately greater amount of primary air to compensate for the proportionately greater losses, even though the cubage of the rooms is identical. In my new, improved system it will be apparent that only the amount of air necessary to provide ventilation requirements need be supplied, since transmission losses are taken care of by the heated water flow through the unit coil at such times as these losses are not compensated for by internal heat gains. This allows for somewhat smaller air handling equipment and proportionately smaller refrigeration and heating equipment.

In a modified method of operating my new improved system, I deliberately take a slight operational loss in order to gain an advantage in initial or first costs of the installed system. In this modified method, rather than supply primary air at a "neutral" temperature, I supply it at the design temperature. By doing this I remove the necessity for insulating the air supply ducts, which otherwise would be necessary to prevent them from sweating when the air is supplied at a lower temperature. I take a loss in heating this air up to 75° F. in those rooms in which cooling may be needed in that the air then has to be cooled down. However, since the amount of primary air supplied is small and since this air does not reach the rooms at a temperature lower than approximately 52° F. in any event, this loss is a small one. It becomes a question of economics then as to which method of operation is preferable under the circumstances.

It is an object of the invention, therefore, to provide in an air conditioning system, including a plurality of heat-exchange coils in air communication with rooms to be conditioned, means for delivering primary conditioned air to the rooms, means for flowing room air over the coils in heat-exchange relation therewith, means for supplying heated liquid and chilled liquid concomitantly to the coils for flow therethrough, the flow of the heated or chilled liquid being dependent on whether it is desired to add heat to the room air or to remove heat therefrom, and wherein a common return line is provided for the heated and chilled liquid exiting the various coils.

It is a further object of the invention to provide in an air conditioning system, including a plurality of induction units located in air communication with rooms to be conditioned with each unit having a heat-exchange coil and a nozzle therein, means for supplying primary air to the units at a pressure sufficiently high to induce a flow of room air through the units and over the heat-exchange coils, means for supplying heated liquid and chilled liquid concomitantly to the heat-exchange coils for flow therethrough, the flow of the heated or chilled liquid being dependent on whether it is desired to add heat to the room air or to remove heat therefrom, and wherein a common return line is provided for the heated and chilled liquid exiting the various coils. It is a still further object to provide, in a system of the type just above mentioned, means for conditioning the primary air prior to its being supplied to the induction units.

Another object of the invention is to provide an air conditioning system of the type just above-mentioned, including a refrigerating system for chilling the chilled liquid supplied to the induction units and having means for dissipating heat picked up by said chilled liquid into the water to be heated, and wherein a cooling tower is provided for dissipating that heat picked up by the chilled liquid greater than the amount which can be dissipated into the liquid to be heated. Yet another object is to provide a system of the type just abovementioned, wherein during those times of the year that the outside temperature is sufficiently low, the refrigerating system is closed down and the cooling tower utilized for chilling the chilled liquid supplied to the induction unit. Still another object is to provide in a system of the type just abovementioned, means for "winterizing" the cooling tower to prevent freeze ups therein during such times of the year as the outside temperature drops below freezing.

The invention consists of the novel constructions, arrangements and devices to be hereinafter described and claimed for carrying out the above-stated objects and such other objects as will appear from the following description of preferred embodiments of the invention described with reference to the accompanying drawing, in which:

The figure is a schematic representation of the hereinabove disclosed air conditioning system.

In conditioning a building with my new system, only one primary air conditioner need be provided, since the primary air is supplied to all rooms either at its "neutral" or design temperature and no account need therefore be taken of the solar effect on any exposure which could necessitate different primary air temperatures in a conventional system.

Turning now to the figure, a building to be conditioned is provided with a primary air conditioner 10 and a plurality of induction units 11 (only one of which is shown), with a unit 11 being in air communication with each space to be conditioned.

Primary air conditioner 10 comprises a casing 12 in which is located a filter 13, a pre-heater coil 14, a dehumidifying coil 15, a condenser water re-heat coil 16, a steam re-heat coil 17 and a fan 18 of any conventional type. Fan 18 is generally of a constant speed type and of sufficient capacity to deliver to all units 11 primary air at the required static pressure to provide for the necessary air velocity at the nozzles to produce the desired induction effect when the air discharges within the units. Air inlet openings 19 are provided in the casing 12 and the flow of air therethrough is controlled by a damper 20. A discharge conduit 21 serves to connect the fan to the various units 11 and terminates therein in discharge openings 22.

Only one unit 11 has been shown, but it will be appreciated that as many units will be provided as is necessary to serve the building, with one or more units being in air communication with each room to be conditioned. Each unit contains a heat-exchanger coil 23, a plenum chamber 24, an air discharge nozzle 25 and an air outlet 26, from which the air is discharged into the room to be conditioned.

Central refrigerating means are provided for supplying chilled water to the units 11 at any desired temperature. Any type of refrigerating system with the usual thermostatic controls for maintaining the desired chilled water temperature is provided and includes a compressor 27, a water-cooled condenser 28 and a water chiller 29. Compressor 27 is connected to the inlet of water-cooled condenser 28 by a hot gas line 30. Compressor 27 is connected to the outlet of water chiller 29 by a cold gas line 31. The outlet of condenser 28 is connected to the inlet of water chiller 29 by a liquid line 32, including a thermostatic expansion valve 33. Thermostatic expansion valve 33 comprises the usual bulb 34 connected thereto by way of a capillary 35 with bulb 34 being located on the cold gas line 31 to sense the temperature of the gas passing therethrough. The bulb and capillary contain a volatile fluid so chosen that it will develop a suitable pressure at the desired temperature of the refrigerant leaving the water chiller 29. The pressure thus developed in the bulb is transmitted through the capillary tube 35 to the expansion valve 33 and there acts upon a pressure motor mechanism which is, as usual, connected to actuate the valve element of the expansion valve 33.

The chilled water circuit includes a water pump 36 connected by way of a line 37 to a coil 38 located in a heat-exchanger 39. Coil 38 is connected by a line 40 to a coil 41 located in water chiller 29. Coil 41 is connected with dehumidifying coil 15 by way of a line 42 and a line 43. Lines 42 and 43 are interconnected by a three-way valve 44 having a line 45 connected to the third junction thereof for bypassing chilled water around coil 15. The outlet of dehumidifying coil 15 is connected by way of a line 46 to the cold water inlet of a unit water control valve 47. The outlet of unit valve 47 is connected by a line 48 to the inlet of coil 23 from whence it exits by a return line 49. Return line 49 joins with a line 50 which leads into a line 51 back to the inlet of pump 36. A line 52, including a pressure relief valve 53, is connected between lines 46 and 51.

The circuit for supplying heated water to coils 23 comprises a pump 54 connected by way of a line 55 to a coil 56 located in a heat-exchanger 57. Coil 56 is connected by a line 58 to a coil 59 located in a heat-exchanger 60. Coil 59 is connected by a line 61 to the hot water inlet of valve 47. Valve 47 is of the type that will allow varying flow of either hot water or cold water but never a mixture of the two. The V-D 219 "Duo-Flow" valve, as manufactured by the Controls Division of American Standard Corporation, may be utilized for the purpose. A line 62 joins the juncture of return line 49 and line 50 and leads back to the inlet of pump 54. A line 63 including a pressure relief valve 64 therein is connected between lines 61 and 62.

The condenser water circuit comprises a pump 65 connected by way of a line 66 to a coil 67 located in condenser 28. Coil 67 is connected by a line 68 to a line 69 leading into heat-exchanger 57 by way of a three-way valve 70. Leading from heat-exchanger 57 is an outlet line 71 which joins with a line 72 connected to re-heat coil 16. Lines 71 and 72 are interconnected by a three-way valve 73. A line 74 leads from coil 16 and connects with a line 75 leading to a coil 76 located in a heat-exchanger 77. A line 78 joins coil 76 with a spray header 79 located in a conventional cooling tower indicated diagrammatically at 80. Cooling tower 80 includes a fan as shown conventionally at 81 driven by an electric motor 82 for circulating outside air over the cooling tower. From cooling tower 80 a line 83 leads back to the inlet of pump 65. The third junction of valve 70 is connected by way of a bypass line 84 to line 71. The third junction of valve 73 is connected by way of a bypass line 85 to line 74.

Means are provided for supplying chilled cooling tower water to heat-exchanger 39 during such times of the year as the refrigeration system is not in operation. These means take the form of a pump 86 having its inlet connected to heat-exchanger 39 by way of a line 87. Pump 86 discharges into a line 88 which is connected with line 75. A line 89 joins line 83 with the heat-exchanger 39 to complete the circuit.

Means are provided for insuring that no freeze ups occur in cooling tower 80 during those times of the year that the outside temperature drops below freezing which is known as "winterizing" the cooling tower. This takes the form of a tank 90 located within the building having an inlet line 91 connected to a suitable source of water, such as a city main. The discharge from inlet line 91 is controlled by a conventional float valve 92. A line 93 connects the outlet of tank 90 to a pump 94. Pump 94 discharges into a line 95 which leads into water tower 80. The discharge through line 95 is controlled by a conventional float valve 96. A bypass line 97 including a pressure relief valve 98 connects line 95 with tank 90. The aforementioned heat-exchanger 77 including coil 76 is part of the "winterizing" means and means are provided for supplying a heating medium thereto which includes an inlet line 99. The flow through line 99 is controlled by a valve 100. The outlet of the heating medium from heat-exchanger 77 is by way of a line 101. Thermostatic control means including a two-step thermostat 102 having a bulb 103 attached thereto by way of a capillary 104, are provided controlling the operation of motor 82 and for opening and closing valve 100, thereby controlling the admission of the heating medium into heat-exchanger 77.

A steam line 105 serves to conduct steam derived from any suitable source to lines 106 and 107 connected to pre-heater coil 14 and steam re-heat coil 17 respectively. Lines 108 and 109 discharge the steam from coils 14 and 17 into a common steam return line 110. Valves 111 and 112 control the flow of steam through lines 106 and 107 respectively. Valve 111 is controlled by a thermostat 113 located in the air stream off of coil 14 to maintain the temperature of the air passing thereover no lower than approximately 40° F. to prevent any freeze ups within the primary air conditioner 10. A thermostat 114 is provided to control the operation of valves 73 and 112.

Steam line 115 serves to conduct steam to heat-exchanger 60 and has a valve 116 therein for controlling the flow. An outlet line 117 is provided for receiving the steam discharging from heat-exchanger 60.

A master-submaster thermostatic arrangement 118—119 of any well-known type is provided for controlling the temperature of the heated water leaving coil 59 according to outside conditions. Two-step thermostat 118 has a bulb 120 attached thereto by way of a capillary 121 with bulb 120 located on the line 61 in a position to sense the temperature of the water passing therethrough. Two-step thermostat 118 controls the operation of valves 70 and 116. Thermostat 119 is located outside the conditioned space and serves to reset thermostat 118 to provide hotter or colder water as the outside temperature drops or rises respectively in order that water at a sufficiently high temperature may be supplied to coils 23 to take care of transmission losses from the room under the worst circumstances; that is, when there are no internal heat gains. Since such an arrangement is well known and forms no part of the invention, per se, the above description is believed adequate.

A thermostat 122 is provided within each room to be conditioned and controls the operation of each unit valve 47.

*Operation*

Turning again to the figure, the various water flows will be traced. Assuming an outside temperature above the design temperature, then, in addition to the internal heat gains due to people, lights, solar effect, etc., there will be a heat transmission gain through the walls and glass areas of the rooms.

For the chilled water flow, valve 44 is set as shown and chilled water flows through coil 38 under the influence of pump 36. However, since heat-exchanger 39 is inoperative except during those times of the year that the refrigerating system is shut down and the cooling tower is operative to produce chilled water, there is no transfer of heat therein. The water then flows through line 40 into coil 41, being chilled therein by the action of the evaporating refrigerant within the water chiller 29. The chilled water exits coil 41 by way of line 42 and is then directed by valve 44 into line 43 whence it flows through dehumidifying coil 15. On leaving the dehumidifying coil 15 the chilled water then flows through line 46 to valve 47. Should any or all of the valves 47 be closed under the influence of a thermostat 122, then pressure relief valve 53 opens bypassing the chilled water around the units 11 and back to the inlet of pump 36. This insures full flow of the chilled water through dehumidifying coil 15 at all times to properly condition the primary air.

Assuming, however, that some cooling is needed, then the various valves 47 are biased by the respective room thermostats 122 to a position allowing flow of chilled water therethrough and into coils 23. The chilled water leaves the coils 23 through lines 49 flowing thence by way of lines 50 and 51 back to the inlet of pump 36 for eventual return to the coil 41 within water chiller 29.

It will, of course, be apparent that the refrigerating system is in operation in order to chill the water flowing through coil 41. Compressor 27 compresses gaseous refrigerant to a pressure and corresponding temperature sufficiently high that in flowing through line 30 into condenser 28 the gaseous refrigerant is condensed to a liquid therein, giving up its heat to the water flowing through coil 67 under the influence of pump 65. The liquid refrigerant then exits condenser 28 by way of line 32 en route to water chiller 29. In passing through thermostatic expansion valve 33, the pressure and corresponding temperature of the liquid refrigerant is reduced to a point wherein it can remove the heat from the water flowing through coil 41 en route to the unit coils 23. The liquid refrigerant is vaporized by the heat absorbed and the vapor then flows through cold vapor line 31 back to the inlet of compressor 27 to complete the refrigerating cycle.

The heated water, to be supplied units 11, flows through line 55 into coil 56 under the influence of pump 54. In its passage through coil 56 the water is heated by hot condenser water flowing through heat-exchanger 57. The heated water exits coil 56 by way of line 58 en route to coil 59. During the summer cycle more heat than can be utilized by the heated water is supplied by the condenser water and steam heated heat-exchanger 60, therefore, is inoperative. The heated water then flows through line 61 to valve 47 where it is available for flow through coil 23 should the same be necessary.

The condenser water flowing through coil 67 leaves the coil 67 by way of line 68 and then is partly diverted by valve 70 into line 84 bypassing heat-exchanger 57. Valve 70 permits as much condenser water to flow through heat-exchanger 57 as is necessary to supply sufficient heat to the water flowing through coil 56 to satisfy the demands of thermostat 118. The condenser water then flows through line 71 and is directed by valve 73 into line 85 bypassing coil 16 in primary conditioner 10. From line 85 the condenser water flows into line 74 and thence into line 75 and through coil 76 and heat-exchanger 77. Heat-exchanger 77 is, of course, inoperative except during the winter cycle of operation. The condenser water exits coil 76 by way of line 78 and thence flows through spray header 79 into water tower 80. The heat is removed from the water by the action of the air flowing thereover under the influence of fan 81. The condenser water exits cooling tower 80 by way of line 83 flowing back to the inlet of pump 65 to complete the circuit.

The primary or outside air entering the primary conditioner 10 is filtered and dehumidified by the chilled water flowing through coil 15 and then delivered by the fan 18 to the various room units 11. The temperature of the air is "neutral," that is, once it is chilled by dehumidifying coil 15 to properly dehumidify it, it is allowed to pass at that temperature to the room units. It will be apparent that the air is sufficiently chilled by coil 15 to take care of a portion, or perhaps all of the heat gains within the room, depending on the outside temperature. Should a greater cooling effect be needed than can be provided by the incoming primary air, then valve 47 is biased to a position allowing flow of cold water through coil 23. Should the heat gains into the rooms be so small that the primary air would have the tendency to chill the room below its design temperature, then valve 47 is biased such that heated water from line 61 flows through coil 23 to compensate and maintain the design temperature. It can be seen that valve 47 is always biased in the same direction to provide cooling and similarly to provide heating. There is no necessity for the summer-winter controls of the conventional system which must be reversed from summer to winter operation.

It will be apparent that if it is desired to operate the system such that the primary air is delivered at its design temperature, then valve 73 is operative under the influence of thermostat 114 to permit condenser water to flow through coil 16 rather than be bypassed therearound. Should there be insufficient heat in the condenser water to raise the temperature of the primary air to the desired 75° F., then valve 112 is biased to an open position under the influence of thermostat 114 to allow flow of steam through coil 17 to provide the additional heat required.

As soon as the outside temperature drops below the design temperature, it will be apparent that the only effect will be to raise the heat requirements both of the heated water and of the primary air when delivered at its design temperature. As was pointed out above, when the condenser water is unable to satisfy the requirements of the primary air, the steam coil 17 becomes operative. Also, should valve 70 be biased to a fully open position and still be unable to satisfy the requirements of thermostat 118, then valve 116 is biased to an open position allowing flow of steam into heat-exchanger 60 in sufficient quantities to bring the temperature of the heated water flowing therethrough to its desired temperature.

As soon as the outside temperature drops to a point sufficiently low that the cooling tower can be utilized to remove the heat picked up by the chilled water and maintain it at the desired temperature of approximately 52° F. at the room units, then the refrigerating system is shut down. Pump 65 is put out of operation since there is no heat to be picked up from condenser 28. Therefore, there is no condenser water available for heat-exchanger 57 or coil 16 and heat-exchanger 60 and coil 17 will be operative to supply by steam the full requirements of heat. Pump 86 is put into operation and cold water leaving cooling tower 80 flows through line 83 and thence into line 89 to heat-exchanger 39 serving to chill the water passing through coil 38. The cooling tower water exits heat-exchanger 39 by way of line 87 and thence flows under the influence of pump 86 into line 88. From line 88 the cooling tower water flows into line 75, through coil 76 and line 78 into spray header 79 of cooling tower 80. The water gives up the heat picked up from the chilled water flowing through coil 38 to the air flowing through cooling tower 80 under the influence of fan 81.

At such times of the year that the outside temperature drops sufficiently low to present a possible freeze up hazard, then this temperature is transmitted to the cooling tower water and sensed by bulb 103. Thermostat 102 then acts to stop motor 82, taking fan 81 out of operation. Should the temperature of the water leaving the cooling tower 80 still continue to drop indicating further falling temperatures, then thermostat 102 begins biasing valve 100 to an open position permitting steam to flow through line 99 into heat-exchanger 77 to supply sufficient heat to water flowing through coil 76 to prevent any possible freeze ups.

It will be apparent that pump 86 must continue to operate even at night and on weekends, so that there will be a flow of water through cooling tower 80 with sufficient heat added in heat-exchanger 77 to permit no freeze ups therein. Make up water to cooling tower 80 is supplied to tank 90 through line 91 under the control of float valve 92. This water is then pumped through line 93 under the influence of pump 94 and into line 95 whence it flows into cooling tower 80 up to the level maintained by float valve 96. Should float valve 96 be closed, then water flowing through line 95 under the influence of pump 94 has its pressure raised sufficiently to open pressure relief valve 98 allowing circulation through bypass line 97. Since tank 90 is located within the heated building, there is no danger of the water therein freezing. Further, the continued circulation of water from tank 90 and through line 95 either to tower 80 or back to tank 90, insures that the make up water supply to heat-exchanger 80 cannot become frozen.

During the winter cycle and possibly even before, it will be apparent that the outside air temperature must be such that no further cooling for dehumidification purposes is necessary. During such times of the year, valve 44 is rotated to communicate lines 42 and 45 bypassing the chilled water around dehumidifying coil 15. At the same time, at such times of the year as the entering outside air temperature is under 40° F. presenting the danger of a possible freeze up within primary air conditioner 10, the thermostat 113 is operative to bias valve 111 to an open position permitting flow of steam through pre-heater 14 to maintain the desired entering air temperature.

It will be seen that I have provided an improved induction system well adapted for its intended purposes. Further, I have provided an induction system which does away with the expensive winter-summer controls of former systems and shows operating economies of considerable magnitude.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; means providing a chilled liquid and a heated liquid; means for supplying said chilled liquid to said chilled liquid coil and to each of said heat-exchange coils; means for supplying said heated liquid to each of said heat-exchange coils concurrently with said chilled liquid; a common return line leading from each of said coils receiving said heated and chilled liquids and valve means for selectively flowing either said chilled or said heated liquid through said heat-exchange coils dependent on whether cooling or heating of said rooms is required.

2. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil and a heated liquid coil therein; means for supplying chilled liquid to said chilled liquid coil and heated liquid to said heated liquid coil; a chilled liquid circuit for supplying chilled liquid to each of said heat-exchange coils; a heated liquid circuit for concurrently supplying heated liquid to each of said heat-exchange coils; valve means selectively operable to flow either said chilled or said heated liquid through said heat-exchange coils; a common return line leading from each of said coils receiving said heated and chilled liquids; valve means for flowing said chilled and heated liquids through said chilled and heated liquid coils or for by-passing said liquid therearound.

3. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; a refrigeration system providing a chilled liquid and including a liquid cooled condenser; means for supplying said chilled liquid to said chilled liquid coil and to each of said heat-exchange coils; a liquid circuit, including a liquid heat-exchanger, for simultaneously supplying heated liquid to each of said heat-exchange coils; a common return line leading from each of said coils receiving said heated and chilled liquids; valve means for selectively flowing either said chilled or said heated liquid through said heat-exchange coils dependent on the cooling or heating requirements of said rooms; and means for flowing said condenser liquid through said heat-exchanger in heat-exchange relation with said heated liquid.

4. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; conditioning means for treating said primary air and including a heat-exchange coil; means for supplying a chilled fluid and a heated fluid; means for routing said chilled fluid to said conditioner heat-exchange coil and to each of said unit coils; means for routing said heated fluid to each of said unit coils concomitantly with said chilled fluid; a common return line leading from each of said coils receiving said heated and chilled fluids; and valve means for selectively flowing either said chilled or heated fluid through said unit coils dependent on whether said rooms require heating or cooling.

5. The system as set out in claim 4, and means for rejecting heat picked up by said chilled fluid into said heated fluid.

6. The system as set out in claim 4, and means for bypassing said chilled fluid en route to said unit coils around said conditioner heat-exchange coil.

7. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; a chilled liquid circuit for supplying a chilled liquid to said chilled liquid coil and to each of said heat-exchange coils; a heated liquid circuit for supplying a heated liquid to each of said heat-exchange coils concomitantly with said chilled liquid; a common return line leading from each of said coils receiving said heated and chilled liquids; valve means selectively operable to flow either said chilled or said heated liquid through said heat-exchange coils; and refrigeration means for chilling said liquid in said chilled liquid circuit and for heating said liquid in said heated liquid circuit.

8. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; conditioning means for treating said primary air and including a heat-exchange coil; a chilled fluid circuit and a heated fluid circuit for concurrently supplying chilled and heated fluid to each of said unit coils; means for chilling said chilled fluid and for heating said heated fluid; means for routing said chilled fluid through said conditioner heat-exchange coil en route to said unit coil or for bypassing said conditioner coil; a common return line leading from each of said coils receiving said heated and chilled fluids; and valve means for selectively flowing either said chilled or heated fluid through said unit coil dependent on whether said rooms require cooling or heating.

9. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; a chilled liquid circuit for supplying a chilled liquid to each of said unit heat-exchange coils; a heated liquid circuit for supplying a heated liquid to each of said unit heat-exchange coils concomitantly with said chilled liquid; a common return line leading from each of said coils receiving said heated and chilled liquids; valve means selectively operable to flow either said chilled or said heated liquid through said unit heat-exchange coils; and means for chilling said liquid in said chilled liquid circuit and for heating said liquid in said heated liquid circuit.

10. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; a chilled liquid circuit for supplying a chilled liquid to said chilled liquid coil and to each of said heat-exchange coils; a heated liquid circuit, including a heat-exchanger, for supplying a heated liquid to each of said heat-exchange coils concomitantly with said chilled liquid; a common return line leading from each of said coils receiving said heated and chilled liquids; valve means selectively operable to flow either said chilled or said heated liquid through said heat-exchange coils; refrigeration means including a liquid cooled condenser for chilling said liquid in said chilled liquid circuit; and means for flowing said condenser liquid through said heat-exchanger in heat-exchange relation with said heated liquid.

11. A system according to claim 10, including a cooling tower, and means for flowing said condenser liquid through said heat-exchanger or through said cooling tower or alternatively through both said heat-exchanger and said cooling tower.

12. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; conditioning means for treating said primary air and including a chilled liquid coil and a heated liquid coil therein; a chilled liquid circuit for supplying a chilled liquid to said chilled liquid coil or to each of said unit heat-exchange coils or both said chilled liquid coil and said unit heat-exchange coils; a heated liquid circuit for supplying a heated liquid to said heated liquid coil or to each of said unit heat-exchange coils or both said heated liquid coil and said unit heat-exchange coils, said chilled and heated liquids being supplied concurrently to said heat-exchange coils; a common return line leading from each of said coils receiving said heated and chilled liquids; valve means selectively operable to flow either said chilled or said heated liquid through said unit heat-exchange coils; and refrigeration means for chilling said liquid in said chilled liquid circuit and for heating said liquid in said heated liquid circuit.

13. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; conditioning means for treating said primary air and including a chilled liquid coil therein; a chilled liquid circuit, including a heat-exchanger, for supplying a chilled liquid to said chilled liquid coil and to each of said unit heat-exchange coils; a heated liquid circuit, including a heat-exchanger, for supplying a heated liquid to each of said unit heat-exchange coils concurrently with said chilled liquid; a common return line leading from each of said coils receiving said heated and chilled liquids; valve means selectively operable to flow either said chilled or said heated liquid through said unit heat-exchange coils; refrigeration means including a liquid cooled condenser for chilling said liquid in said chilled liquid circuit; a cooling tower; means for flowing said condenser liquid through said heated liquid circuit heat-exchanger or through said cooling tower or through both said heat-exchanger and cooling tower; means for shutting down said refrigeration means; and means for routing said condenser liquid in a circuit including said cooling tower and said chilled liquid circuit heat-exchanger when said refrigeration means is shut down.

14. The system of claim 13 including a second heat-exchanger in said heated liquid circuit; and means for supplying a heating medium to said second heated liquid circuit heat-exchanger when said refrigeration system is shut down.

15. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; conditioning means for treating said primary air and including a chilled liquid coil therein; a chilled liquid circuit, including a heat-exchanger, for supplying a chilled liquid to said chilled liquid coil and to each of said unit heat-exchange coils; a heated liquid circuit, including a heat-exchanger, for supplying a heated liquid to each of said unit heat-exchange coils concurrently with said chilled liquid; a common return line leading from each of said coils receiving said heated and chilled liquids; valve means selectively operable to flow either said chilled or said heated liquid through said unit heat-exchange coils; refrigeration means including a liquid cooled condenser for chilling said liquid in said chilled liquid circuit; a cooling tower; means for flowing said condenser liquid through said heated liquid circuit heat-exchanger in heat-exchange relation with said heated liquid; means for shutting down said refrigeration system; and means for flowing said condenser liquid in a circuit including said cooling tower and said chilled liquid circuit heat-exchanger when said refrigeration system is shut down.

References Cited in the file of this patent

UNITED STATES PATENTS

| | | |
|---|---|---|
| 1,969,187 | Schutt | Aug. 7, 1934 |
| 2,357,706 | Topperwein | Sept. 5, 1944 |
| 2,363,294 | Carrier | Nov. 21, 1944 |
| 2,492,757 | Meek | Dec. 27, 1949 |
| 2,500,695 | McGrath | Mar. 14, 1950 |
| 2,715,515 | Stair | Aug. 16, 1955 |
| 2,796,740 | McFarlan | June 25, 1957 |
| 2,797,068 | McFarlan | June 25, 1957 |
| 2,915,298 | Hamlin et al. | Dec. 1, 1959 |
| 2,928,260 | Blum | Mar. 5, 1960 |
| 2,935,857 | McFarlan | May 10, 1960 |

FOREIGN PATENTS

| | | |
|---|---|---|
| 656,492 | Great Britain | Aug. 22, 1951 |

Notice of Adverse Decision in Interference

In Interference No. 95,082 involving Patent No. 3,024,008, R. D. Blum, THREE-PIPE AIR CONDITIONING SYSTEMS, final judgment adverse to the patentee was rendered Feb. 3, 1967, as to claim 9.

[*Official Gazette November 7, 1967.*]